(12) United States Patent
Blot et al.

(10) Patent No.: US 8,562,335 B2
(45) Date of Patent: Oct. 22, 2013

(54) INJECTION INTERFACE DEVICE

(75) Inventors: Philippe Blot, Nantes (FR); Joel Chanteux, Bouguenais (FR); Thierry Giraudet, Sallertaine (FR); Romuald Guillou, Saint-Colomban (FR); Laurent Thomazeau, Saint Philibert de Grand Lieu (FR); Xavier Lutun, Bouguenais (FR)

(73) Assignee: Airbus Operations S.A.S., Toulouse (FR)

( * ) Notice: Subject to any disclaimer, the term of this patent is extended or adjusted under 35 U.S.C. 154(b) by 0 days.

(21) Appl. No.: 13/384,076

(22) PCT Filed: Jul. 13, 2010

(86) PCT No.: PCT/FR2010/051480
§ 371 (c)(1),
(2), (4) Date: Mar. 26, 2012

(87) PCT Pub. No.: WO2011/007099
PCT Pub. Date: Jan. 20, 2011

(65) Prior Publication Data
US 2012/0171321 A1 Jul. 5, 2012

(30) Foreign Application Priority Data
Jul. 16, 2009 (FR) .................................... 09 54940

(51) Int. Cl.
*B29C 45/20* (2006.01)
(52) U.S. Cl.
USPC ...................................... 425/549; 264/328.15
(58) Field of Classification Search
USPC ...................................... 425/549; 264/328.15
See application file for complete search history.

(56) References Cited

U.S. PATENT DOCUMENTS

| 5,423,581 | A | 6/1995 | Salyers | |
|---|---|---|---|---|
| 5,709,413 | A | 1/1998 | Salyers | |
| 5,879,727 | A * | 3/1999 | Puri | 425/549 |
| 7,883,333 | B2 * | 2/2011 | Watanabe et al. | 425/564 |
| 2005/0031728 | A1 * | 2/2005 | Babin et al. | 425/549 |
| 2005/0225000 | A1 * | 10/2005 | Tabassi | 264/40.1 |
| 2010/0028481 | A1 * | 2/2010 | Olaru | 425/549 |

FOREIGN PATENT DOCUMENTS

FR 2 079 486 11/1971
WO 2006 005110 1/2006

OTHER PUBLICATIONS

International Search Report Issued Oct. 29, 2010 in PCT/FR10/051480 Filed Jul. 13, 2010.

* cited by examiner

*Primary Examiner* — Tim Heitbrink
(74) *Attorney, Agent, or Firm* — Oblon, Spivak, McClelland, Maier & Neustadt, L.L.P.

(57) ABSTRACT

An interface device between an injection tube and a mold provided with an injection hole, wherein the interface device includes a terminal element for an injection tube, with an end piece inserted into one end of the tube and a sealing ring that slides onto the tube, and a mechanism for holding and clamping the terminal element. The mechanism which is to be screwed into a mounting that is rigidly connected to the mold and is arranged around the injection hole, forms a seal between an injection end of the end piece and a sealing surface of the mold at the injection hole. The dismantlable assembly includes a screw-on socket that has a supporting surface for the sealing ring.

10 Claims, 3 Drawing Sheets

INJECTION INTERFACE DEVICE

BACKGROUND

The present invention relates to an improved interface device for connecting an injection tube to a mold element, particularly for the low pressure injection of resins or the injection of silicon products or any other pasty product.

The low pressure injection of resins into a mold uses a tube connected by an interface means that allows the resin to flow into the mold.

A known interface means is shown in FIG. 1.

This interface means is comprised of a connector A that includes a first end provided with a tubular segment onto which a tube 2 is attached with the help of a clamp collar C and includes a second end screwed into a threaded hole B of the mold.

To maintain a seal at the screwed end, the threading of the interface means is surrounded with a film or Teflon (registered trademark) tape.

This interface device comprises an imperfect seal in the threading, risking wear of the threading in the mold when frequent disassembly is required for cleaning the connection, and because the attachment of the tube with resin is carried out using a clamp collar, special precautions are necessary to avoid pinching the tube.

In addition, the difficulty associated with cleaning this device may cause the sealing surface to deteriorate.

SUMMARY

The present invention improves such an interface device to make it more reliable at the seal level and easier to assemble and/or disassemble for cleaning and or possible replacement.

To do this, the present invention provides an interface device between an injection tube and a mold provided with an injection hole, characterized in that the interface device comprises a terminal element for an injection tube, comprising an end piece inserted into one end of the tube and a sealing ring fitted on the tube, and a means for holding and clamping the terminal element, said means, being adapted to be screwed into a mounting that is rigidly connected to the mold and is arranged around the injection hole, and adapted to form a seal between an injection end of the end piece and a sealing surface of the mold at the injection hole, the dismantable assembly comprising a screw-on socket having a surface bearing on the sealing ring.

The screw-on socket is extended toward said end of the tube by a container screwed into said mounting, and the screw-on socket and the container are separate parts with complementary threadings.

According to an advantageous embodiment, the container constitutes a jacket to radially support the end piece and to adjust the diameter between the mounting and the end piece.

Advantageously, the end piece comprises a first tubular segment inserted into the end of the tube and the sealing ring fitted on the tube compresses the tube on said first tubular segment under the action of the screw-on socket.

Preferably, the end piece comprises a second tubular segment forming a centering flange and a stop for the end piece.

According to a first embodiment, the end piece comprises a tapered injection end that complements the tapered injection hole forming said sealing surface.

In this case, the outlet face of the end piece is advantageously flush with the inner surface of the mold.

According to a second embodiment, the end piece comprises an outlet face for an injected product that is suitable for being applied to the outer face of the mold surrounding the injection hole and forming said sealing surface.

In this case, the outlet face of the end piece advantageously comprises a groove fitting a peripheral seal.

BRIEF DESCRIPTION OF THE DRAWINGS

Other characteristics and advantages of the invention will be apparent upon reading the following description of a non-exclusive example embodiment of the invention with reference to the drawings that show.

DETAILED DESCRIPTION

Figure 1:
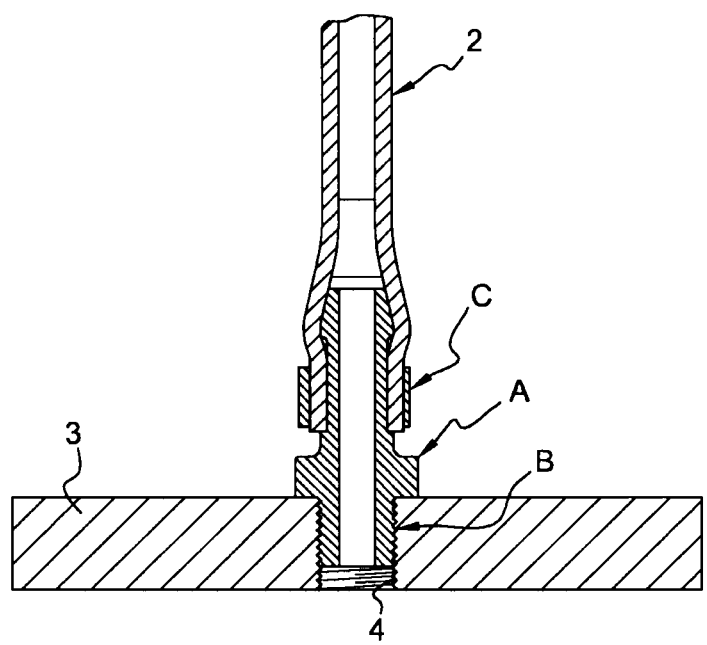
In FIG. 1: an injection device of the prior art.
Figure 2B:
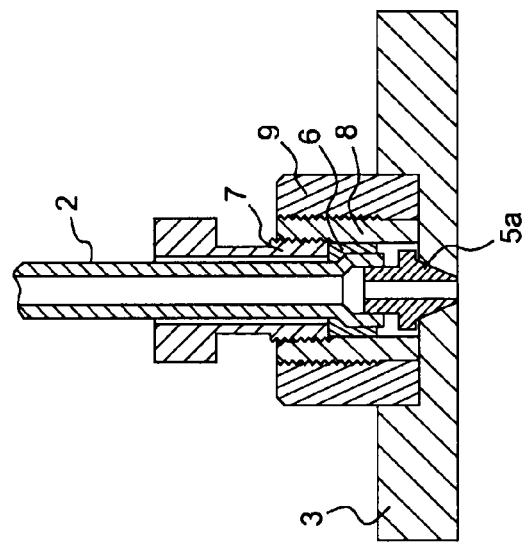
In FIG. 2B: a sectional view of the device in FIG. 2, assembled.
Figure 2A:
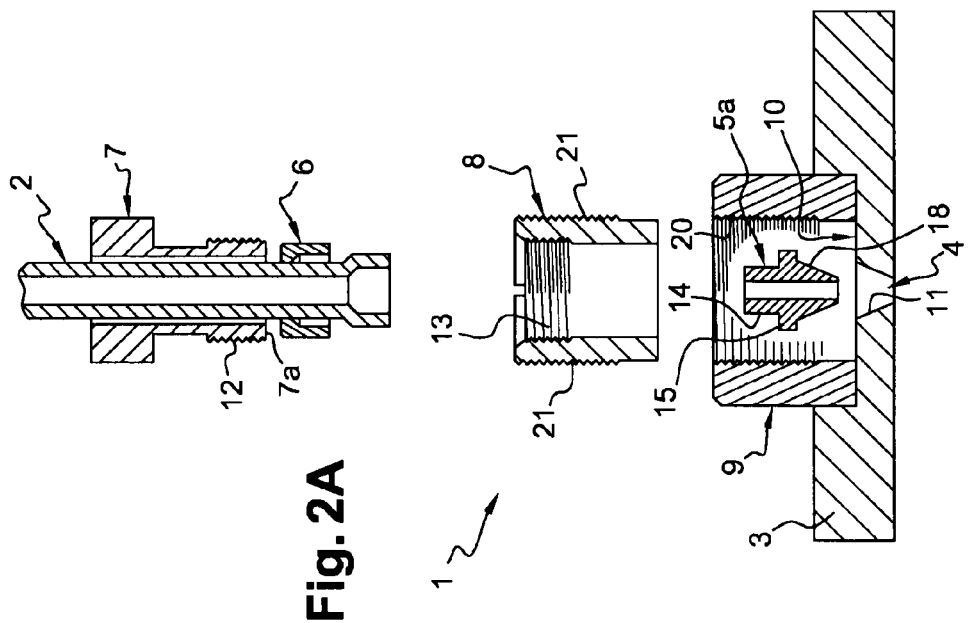
In FIG. 2A: an exploded sectional view of a first embodiment of a device according to the invention.

A first embodiment of the improved interface device of the invention is shown in FIG. 2A.

The interface device 1 is intended to connect in a dismantlable way to a tube supplying a product to be injected, such as a resin with an injection hole 4 made in a mold.

According to this invention, the interface device comprises a terminal element for an injection tube, comprising an end piece 5a inserted into the end of the tube 2 and a sealing ring 6 fitted onto the tube.

The ring comprises an inside shape that presses the tube onto the portion 14 of the end piece that is inserted into the tube.

The device further comprises a means 7, 8 of holding and clamping the terminal element suitable for holding the terminal element by pressing against a portion of the mold and clamping the terminal element onto the tube.

This means is adapted to be screwed into a mounting that is rigidly connected to the mold and is arranged around the injection hole 4.

According to the embodiment, it comprises a screw-on socket 7 and a container 8 itself screwed into said mounting 9.

The screw-on socket 7 and the container 8 are separate parts with complementary threadings 12, 13.

The container 8 into which the screw-on socket 7 is screwed allows to reduce the diameter around the terminal element comprised of the end piece and the ring. It also provides an interface that can be replaced in case the inner threading of the container becomes worn after frequently assembling and disassembling the screw-on socket.

Within the scope of the invention, it is also possible for the screw-on socket to be screwed directly into the mounting 9, but in this case, the space around the end piece is reduced, which causes problems for cleaning the area around the hole if the resin overflows. In this case, maintenance in case of wear of the inner threading of the mounting 9 becomes more difficult.

Moreover, in case of frequent disassemblies of the screw-on socket, the use of the container 8 provided with outside threading 21 and screwed into the mounting 9 prevents wear of the mounting threading 20 because the disassembly and reassembly stresses the treading 12 and 13 between the screw-on socket and the container.

To apply the end piece to the mold, the screw-on socket 7 has a supporting surface 7a on the sealing ring 6.

According to this example, the end piece 5a comprises a tapered injection end 18 that complements the tapered 11 injection hole forming said sealing surface.

The assembled device is shown in FIG. 2B.

When the screw-on socket is screwed into the container, which itself is screwed into the mounting 9, this presses on the ring 6 and holds the tube under pressure on the end piece and tightens the connection between the end piece and the tube.

Moreover, when the screw-on socket is screwed, the terminal element comprised of the ring and the end piece is clamped between the upper surface 10 of the mold and the supporting surface 7a, the clamping of the screw-on socket also provides sealing between an injection end of the end piece and a sealing surface 11 of the mold at the injection hole.

In this example, the sealing surface between the terminal element of injection of the end piece and the injection hole is the tapered surface 11 of the hole against which the tapered terminal element 18 of the end piece is held.

Also in this example, the outlet face of the end piece is flush with the inside surface of the mold, and the end piece delivers the product, such as resin, to be injected directly into the mold.

This configuration has the advantage that, if the resin solidifies, one can simply unscrew the screw-on socket, remove the end piece 5a, the tube 2, and the ring 6 and then, replace this assembly, and screw back on the screw-on socket to make the device operational again.

In this case, the end piece and the ring can advantageously be made of a plastic material that can be easily replaced at a low cost.

Figure 3B:
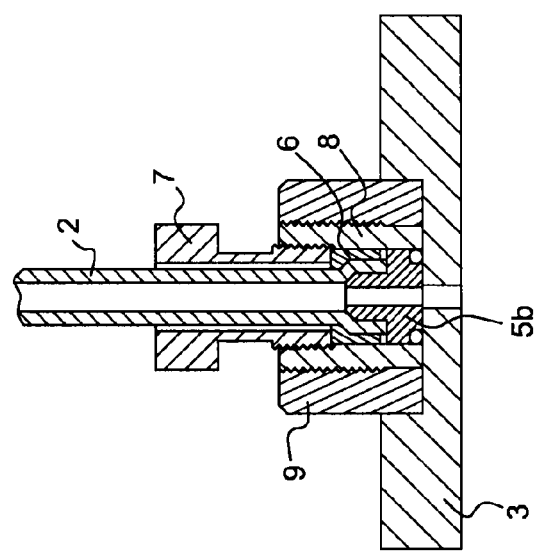
In FIG. 3B: a sectional view of the device in FIG. 3, assembled.
Figure 3A:
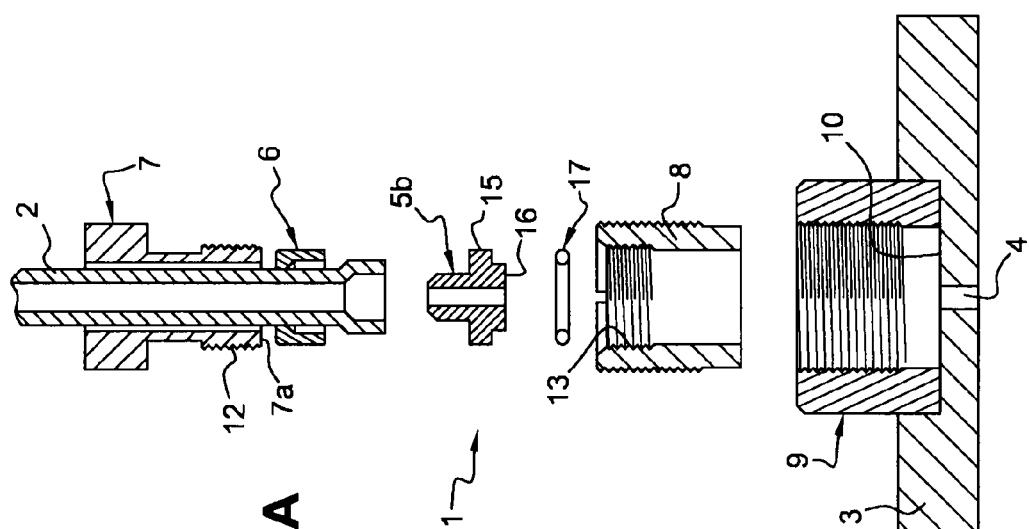
In FIG. 3A: an exploded sectional view of a second embodiment of a device according to the invention.

The example in FIG. 3A differs from that in FIG. 2 in that the end piece 5b comprises an outlet face 16 of an injected product that is suitable for being applied to the outer surface 10 of the mold surrounding the injection hole that provides the sealing surface between the end piece and the mold.

In this example, the outlet face 16 of the end piece comprises a groove fitting a peripheral seal 17 that prevents injectable material from exiting between the end piece and the mold.

The assembly of this second embodiment is shown in FIG. 3B.

In this case, the sealing at the junction of the tube 2 and the end piece 5b and the sealing between the end piece and the mold is still carried out by screwing the screw-on socket into the container 8 that constitutes a jacket to radially support the end piece 5b and to adjust the diameter between the mounting 9 and the end piece.

However, the hole formed in the mold 3 constitutes the injection nozzle for the material to be injected.

In this example, the hole 4 is slightly tapered so that, if a clump of resin solidifies at the end of injection, the clump can be removed with the injection end piece or by pulling from outside of the mold.

In this configuration, the end piece can be a metal end piece that is stronger than a plastic end piece and can withstand higher levels of injection pressure.

In either the example in FIG. 2A or the example in FIG. 3A, the end piece 5a, 5b comprises a first tubular segment 14 inserted into the end of the tube 2 and the sealing ring 6 fitted onto the tube, compresses the tube on said first tubular segment under the action of the screw-on socket.

In the example in FIGS. 3A and 3B, the end piece 5b comprises a second tubular segment 15 forming a centering flange for the end piece in the container 8 and relative to the hole 4.

In FIGS. 2A and 2B, the second tubular segment forms a shoulder for guiding the end piece into the container 8 before the tapered faces 18 and 11 come into contact.

Because the interface device of the invention uses a screw-on socket means of holding and clamping, this allows for a quick manual disassembly and assembly of the injection interface device while maintaining an effective seal for low pressure or gravity injection.

The container 8 in the device of the invention constitutes a jacket to radially support the end piece 5a, 5b, to adjust the diameter between the mounting 9 and the end piece, and advantageously constitutes a means of interchangeability in case the threading 13 wears.

The invention is not limited to the examples shown, and in particular, the injection end of the end piece can be comprised of an injection nozzle of various shapes while remaining within the scope of protection determined by the claims.

The invention claimed is:

1. An interface device, between an injection tube and a mold provided with an injection hole, the interface device comprising:
   - a terminal element for the injection tube, the terminal element including an end piece suitable for being inserted into one end of the injection tube; and
   - a sealing ring, suitable for being fitted onto the injection tube, and a means for holding and clamping the terminal element into a mounting that is rigidly connected to the mold and is arranged around the injection hole, the sealing ring forming a seal between an injection end of the end piece and a sealing surface of the mold at the injection hole,
   - wherein the means for holding and clamping forms an assembly including a screw-on socket bearing a supporting surface for the sealing ring, the screw-on socket extending towards said end of the injection tube and towards a container adapted to be screwed into said mounting, the screw-on socket and the container being separate parts with complementary threadings.

2. The interface device according to claim 1, wherein the container constitutes a jacket to radially support the end piece.

3. The interface device according to claim 2, wherein the end piece comprises a first tubular segment inserted into the end of the injection tube, and
   wherein the sealing ring fitted onto the injection tube compresses the injection tube on said first tubular segment under the action of the screw-on socket.

4. The interface device according to claim 3, wherein the end piece comprises a second tubular segment forming a centering flange for the end piece.

5. The interface device according to claim 3, wherein the end piece comprises a tapered injection end that complements a taper of the injection hole forming said sealing surface.

6. The interface device according to claim 5, wherein an outlet face of the end piece is flush with an inside surface of the mold.

7. The interface device according to claim 3, wherein the end piece comprises an outlet face for an injected product that is suitable for being applied to an outer face of the mold surrounding the injection hole and comprising said sealing surface.

8. The interface device according to claim 7, wherein the outlet face of the end piece comprises a groove fitting a peripheral seal.

9. The interface device according to claim 1, wherein the means for holding and clamping is threaded for screwing.

10. The interface device according to claim 1, wherein the assembly is removably assembled.

* * * * *